United States Patent [19]

Zaidi et al.

[11] Patent Number: 5,996,064

[45] Date of Patent: Nov. 30, 1999

[54] METHOD AND APPARATUS FOR GUARANTEEING MINIMUM VARIABLE SCHEDULE DISTANCE BY USING POST-READY LATENCY

[75] Inventors: Nazar A. Zaidi, San Jose; Michael J. Morrison, Santa Clara; Elango Ganesan, Sunnyvale, all of Calif.

[73] Assignee: Intel Corporation, Santa Clara, Calif.

[21] Appl. No.: 09/001,251

[22] Filed: Dec. 30, 1997

[51] Int. Cl.⁶ .................................................. G06F 9/38
[52] U.S. Cl. ........................ 712/216; 712/214; 712/215
[58] Field of Search .................... 712/214, 215, 712/216

[56] References Cited

U.S. PATENT DOCUMENTS

| | | | |
|---|---|---|---|
| 5,555,432 | 9/1996 | Honton et al. | 712/23 |
| 5,590,368 | 12/1996 | Heed et al. | 712/43 |
| 5,655,096 | 8/1997 | Branigin | 712/200 |
| 5,771,241 | 6/1998 | Brummel | 714/733 |
| 5,872,948 | 2/1999 | Mallick et al. | 712/214 |
| 5,887,174 | 3/1999 | Simons et al. | 712/216 |

*Primary Examiner*—William M. Treat
*Attorney, Agent, or Firm*—Blakely, Sokoloff, Taylor & Zafman LLP

[57] ABSTRACT

A method for guaranteeing minimum variable scheduling distance between instructions in a processor includes receiving a plurality of instructions and determining the post-ready latency of each instruction. Each instruction is then scheduled for execution so that the instruction follows an earlier instruction by an amount of time at least equal to the post-ready latency of the instruction.

22 Claims, 4 Drawing Sheets

| Scheduler Information for Instruction 1 | Post-Ready Latency for Instruction 1 |
|---|---|
| Scheduler Information for Instruction 2 | Post-Ready Latency for Instruction 2 |
| ⋮ | ⋮ |
| Scheduler Information for Instruction N-1 | Post-Ready Latency for Instruction N-1 |
| Scheduler Information for Instruction N | Post-Ready Latency for Instruction N |

FIG. 4A

| Scheduler Information for Instruction 1 |
|---|
| Scheduler Information for Instruction 2 |
| ⋮  ⋮  ⋮ |
| Scheduler Information for Instruction N-1 |
| Scheduler Information for Instruction N |

| Scheduler Information for Instruction 1 | Post-Ready Latency for Instruction 1 |
|---|---|
| Scheduler Information for Instruction 2 | Post-Ready Latency for Instruction 2 |
| ⋮  ⋮  ⋮ | ⋮  ⋮  ⋮ |
| Scheduler Information for Instruction N-1 | Post-Ready Latency for Instruction N-1 |
| Scheduler Information for Instruction N | Post-Ready Latency for Instruction N |

METHOD AND APPARATUS FOR GUARANTEEING MINIMUM VARIABLE SCHEDULE DISTANCE BY USING POST-READY LATENCY

BACKGROUND OF THE INVENTION

1. Field of the Invention

The present invention relates generally to scheduling instructions for execution within a digital processor and, more particularly, to ensuring that the processor separates instructions by an appropriate number of clock cycles to guarantee proper execution of the instructions.

2. Description of the Related Art

Designers of modern processors and computers have increased the operating speeds and efficiency of their designs through a variety of methods and structures. These methods and structures have in part focused on modifying traditional microprocessors that implement "in-order" instruction pipelines. In-order processors usually fetch an instruction stream from the system memory, execute the instruction stream in a sequential program order, and dispatch loads and stores in the sequential program order.

The instructions making up the program code in digital processors typically fall into two broad categories: producer instructions and consumer instructions. Producer instructions, as the term implies, produce results during their execution that consumer instructions in turn use when they execute. In other words, consumer instructions rely on the results of the producer instructions as part of their execution process. For example, suppose a program code instructs the processor to add two numbers, A and B, and to store the sum in location C. The add instruction is a producer instruction; it produces the sum of the numbers A and B and makes that sum available to the store instruction. The store instruction, on the other hand, is a consumer instruction because it relies on the result of the add instruction, i.e., the sum of A and B. In-order processing of the instruction stream ensures that each consumer instruction in the instruction stream observes stores from the producer instructions in the same order. For the same reason, however, the throughput of in-order processors has an inherent limitation.

In more sophisticated modern processors and similar hardware structures, the designers have increased instruction throughput by executing instructions either in parallel or "out-of-order" with respect to the original program or instruction sequence. Out-of-order processors differ from in-order, sequential processors in that they do not execute all instructions in the same order as that of the original instruction sequence. Rather, out-of-order processors employ a variety of techniques aimed at increasing overall efficiency and throughput of the processor by rearranging the order of execution of the original instruction sequence. Out-of-order processors as described here are generally well understood in the prior art.

Frequently, one can improve the operation of an out-of-order processor by making the order of execution of the instructions more flexible. Auxiliary hardware structures and special techniques for treating the instruction sequence help to achieve more flexibility in the instruction execution order. These structures and techniques include: (1) instruction fetchers that employ branch prediction, (2) parallel decoders, (3) large reorder buffers, (4) collision prediction, (5) dependency determination, and (6) renaming of destination registers. Moreover, the structures and techniques for treating the incoming instruction sequence may affect the processor's throughput by synergistic interactions with one another.

Generally, two types of out-of-order processors exist. A first type of out-of-order processor employs a single execution unit. This type of out-of-order processor improves the performance of the execution unit by exploiting the delays associated with the other processing units. For example, this type of processor seeks to keep the execution unit operating during delays inherent in a cache memory's retrieval of data from the main memory.

A second type of out-of-order processor employs multiple execution units. This type of out-of-order processor uses techniques that enhance performance by keeping the execution units operating concurrently as much as possible. The concurrent execution of instructions by multiple processors improves the processor's overall ability to execute instructions in a flexible manner. Flexible execution of instructions may in turn improve the overall performance of the processor and the computer system.

Out-of-order processors typically include a scheduler that has the responsibility of scheduling instructions for execution within the processor's execution unit (or units). Generally, an out-of-order processor fetches an instruction stream from memory and executes ready instructions in the stream ahead of earlier instructions that are not ready. Out-of-order execution of the instructions improves processor performance because the instruction execution pipeline of the processor does not stall while assembling source data (i.e., operands) for a non-ready instruction.

As a part of scheduling instructions, the scheduler determines when an instruction is ready for execution. A ready instruction is typically an instruction that has fully assembled source data and sufficient available execution resources of the appropriate variety (e.g., integer execution unit or floating-point execution unit). A typical out-of-order processor contains several different types of execution units. Each execution unit may generally execute only certain types of instruction. An instruction does not become ready before it has an appropriate execution unit available to it.

Availability of data resources (i.e., operands) also affects when an instruction becomes ready for execution. Some instructions operate on one or more operands. Those instructions will not be ready for execution until their operands become available. Put another way, those instructions typically have a dependency on at least one earlier instruction and cannot execute until the earlier instruction (or instructions) has executed. For example, suppose a first instruction calculates or stores results that a second instruction uses as operands during its execution. In such a scenario, the second instruction cannot begin to execute until the first instruction has executed. Thus, the dependency of the second instruction on the results of the first instruction gives rise to a data dependency of the second instruction on the first instruction.

A processor that implements an out-of-order instruction execution pipeline generates out-of-order result data because it executes the instructions in the instruction stream out-of-order. Although out-of-order execution of instructions provides out-of-order processors with their performance edge over in-order processors, an out-of-order processor must reorder the results of the instructions in the same order as the original program code. Thus, an out-of-order processor may implement a reorder register file or buffer to impose the original program order on the result data after it has executed the instructions out-of-order.

Turning now to the drawings, FIG. 1 illustrates a portion of a traditional out-of-order processor 10. A memory and memory interface unit 12 store the program code and data and provide the processor 10 with access to the memory. The memory and memory interface unit 12 may also include one or more high-speed data and code cache memories (not shown). The cache memories typically contain the contents of recently accessed locations of the memory. Rather than accessing the main memory repeatedly, the processor 10 can retrieve the contents of recently accessed locations from the cache memory. Because of their relatively high speed of operation, the cache memories eliminate the delays associated with accessing the slower system main memory (also contained in the memory and interface unit 12).

An instruction fetch unit 14 includes a fetcher (not shown) that retrieves a sequence of instructions from the memory and memory interface unit 12. The instruction fetch unit 14 sends the retrieved instruction sequence to one or more instruction decode and rename units 16. With the aid of microcode read-only memories (not shown), instruction decoders in the instruction decode and rename unit 16 translate the complex instructions, such as macro-operations (macro-ops), into simpler, hardware-executable micro-operations (micro-ops).

To achieve high efficiency and throughput, the out-of-order processor 10 should ordinarily have the capability of executing the program instructions in any order that keeps the execution unit (or units) 20 continuously busy. For example, executing a second instruction in the original program sequence before a first instruction may enable the processor 10 to avoid a period of inactivity for one of the execution units 20. Instruction dependencies, however, may make the results artificially dependent on the execution order and may interfere with the use of out-of-order execution as a means of improving the efficiency of the processor 10.

To avoid those undesirable dependencies and the resulting loss in processor performance, the processor 10 renames logical destinations to physical destinations as part of reordering the micro-ops for out-of-order execution. To achieve that end, the decoders send a sequence of micro-ops to a renamer (not shown) that resides in the instruction decode and rename unit 16.

The renaming process avoids artificial dependencies created by write-after-write and write-after-read hazards. To understand an example of a write-after-write dependency, assume that two instructions in the instruction stream both write to a register named EAX. Executing the first instruction results in a first value for writing to register EAX. Without register renaming, execution of the second instruction will result in the overwriting of the first value generated by the first instruction, making that value unavailable to any later instructions that require it.

Register renaming allows the removal of the dependency between the first instruction and the second instruction by changing the logical destination EAX of the two instructions to two different physical registers in the processor. As long as the processor 10 has a sufficiently large number of physical registers available, it can execute the two instructions either in-order or out-of-order because the instructions will write their results to two different physical registers. The renamer (not shown), residing in the instruction decode and rename unit 16 of the processor 10, keeps track of this operation.

The renamer reassigns additional physical registers (not shown) to replace the destination registers designated in the micro-ops (i.e., the registers designated for storing the results of various operations). The renamer may also record in a dependency table (not shown) data on the dependencies between the micro-ops of the instruction sequence and on the reassignment of additional physical registers. The renamer may send the micro-ops and their renamed registers to both a reorder buffer (not shown) and to a scheduler 18.

The scheduler 18 has the responsibility of scheduling instructions for execution within the execution units 20. The instructions received from the instruction decode and rename unit 16 form a pool of instructions that the scheduler 18 may assign for execution to one or more execution units 20. To achieve higher efficiency and throughput, the scheduler 18 in an out-of-order processor may assign instructions for execution in a different order than the original order of the instruction sequence fetched by the instruction fetch unit 14 from the memory and memory interface unit 12. To ensure data integrity and to avoid processor failure, the scheduler 18 does not ordinarily assign dependent (i.e., consumer) instructions for execution before the instructions on which they depend (i.e., the producer instructions).

The scheduler 18 may also consult the data dependency table (not shown) residing in the instruction decode and rename unit 16 to determine the instruction dependency information and assignment information on logical and additional physical registers. Based on the consultation, the scheduler 18 may update the dependency and assignment information residing in the dependency table (not shown).

Typically, the scheduler 18 keeps the various items of information pertaining to the pool of instructions in a table, where each entry in the table corresponds to one of the instructions in the pool of instructions. FIG. 4A shows an example of such a table for a pool of N instructions. The table entries typically include the ordinary latency (i.e., the number of clock cycles required for the execution of each instruction) of the instructions.

Turning back to FIG. 1, a reorder and retirement unit 22 receives executed instructions from the execution units 20 and reorders the instructions in the same order as the instruction order of the original program code. The reorder and retirement unit 22 and the execution units 20 send the results of the execution of the instructions to the register file unit 24, as appropriate. The register file unit 24 sends the results of the executed instructions to the memory and memory interface unit 12 for storage in the system main memory, as necessary. Those skilled in the art will appreciate that the above operations are well understood in the prior art.

Out-of-order processors often require a minimum number of clock cycles between the execution of certain types of instruction. One reason for this requirement lies in the latency of the instructions (i.e., the time it takes for a given instruction to execute). FIG. 2A illustrates the execution timeline for two consecutive instructions A and B. Instruction A in FIG. 2A is a producer instruction with a latency of two clock cycles. Instruction B is a consumer instruction that uses the results of the execution of instruction A.

To ensure proper operation, the processor must guarantee a minimum of two clock cycles (the latency of the producer instruction) between the start of execution of instruction A and the start of execution of instruction B. If instruction B begins execution before the expiration of at least two clock cycles after instruction A starts to execute, processor failure will result. FIG. 2A shows a situation where instruction B follows instruction A before the expiration of two clock cycles, thus causing incorrect results and processor failure.

Processors typically use some means for tracking the latency of the producers to ensure that no consumer instruction executes before the expiration of a given number of clock cycles after the execution of the corresponding producer instructions ends. Referring back to FIG. 1, the processor 10 may use a latency counter (not shown) for each instruction in the scheduler 18. When it issues producer instruction A (with a latency of two clock cycles) for execution, the scheduler 18 loads the latency counter of the instruction with the latency of instruction A. The latency counter counts down as instruction A executes. The countdown expires when instruction A finishes execution. The scheduler 18 issues instruction B, the consumer instruction, only upon the expiration of the countdown. In this manner, the processor ensures a number of clock cycles equal to at least the latency of the producer instruction between the execution of the producer and consumer instructions. FIG. 2B illustrates a situation where the processor inserts a proper number of clock cycles between the executions of instructions A and B, thus ensuring proper operation of the pipeline.

Situations arising during the typical operation of the processor often require the processor to insert a larger number of clock cycles between producer and consumer instructions than the minimum necessary for proper execution of the instructions. For example, the processor designer may want to insert additional clock cycles between producer and consumer instructions to allow for special operations, such as fault processing. In the absence of the additional clock cycles, the processor will not have the opportunity to conduct fault processing because the consumer instruction will begin to execute after the expiration of the latency of the producer instruction. Since these additional clock cycles are not always needed for proper operation of the pipeline, they necessarily introduce an unnecessary and undesirable delay much of the time.

Other considerations, such as the architecture and design of the processor itself, sometimes dictate that the processor insert additional clock cycles between producer and consumer instructions. Such considerations often relate to the constraints inherent in a particular processor design. For example, suppose that, because of its design and architecture, an out-of-order machine has no direct bypass between a multimedia unit (MMU) and an integer execution unit (IEU). As a result of the lack of bypass between the units, the processor needs additional clock cycles, say two cycles, to make the output of the MMU available to the IEU. Suppose further that a multimedia operation has a latency of two clock cycles and that the multimedia operation is the producer for a consumer integer operation. If an integer operation follows a multimedia operation by only two clock cycles, a processor failure will result because of the lack of direct bypass between the MMU and the IEU.

As a simple solution to these problems, the processor could add additional clock cycles to all producer instructions. By adding the additional clock cycles, the processor would in effect artificially increase the latency of all producer instructions by the desired number of clock cycles. Alternatively, the processor could artificially increase the latency of only particular producer instructions. Unfortunately, both alternatives have the disadvantage of penalizing the affected instructions and therefore decreasing the overall efficiency and throughput of the processor.

The present invention is directed to overcoming, or at least reducing the effects of, one or more of the problems set forth in the above discussion.

SUMMARY OF THE INVENTION

In one aspect of the present invention, a method is provided for scheduling instructions for execution. The method includes receiving a plurality of instructions and determining the post-ready latency of each instruction. Thereafter, each instruction is scheduled for execution so that the instruction follows an earlier instruction by an amount of time at least equal to the post-ready latency of the instruction.

In another aspect of the present invention, an apparatus is provided for scheduling instructions for execution. A scheduler receives a plurality of instructions and schedules each instruction for execution so that execution of the instruction follows the execution of an earlier instruction by an amount of time at least equal to the post-ready latency of the instruction.

BRIEF DESCRIPTION OF THE DRAWINGS

The foregoing and other advantages of the invention will become apparent upon reading the following detailed description and upon reference to the drawings in which:

FIG. 4A illustrates a scheduler table entry without a post-ready latency field; and, FIG. 4B illustrates a scheduler table entry with a post-ready latency field.

Figure 1:
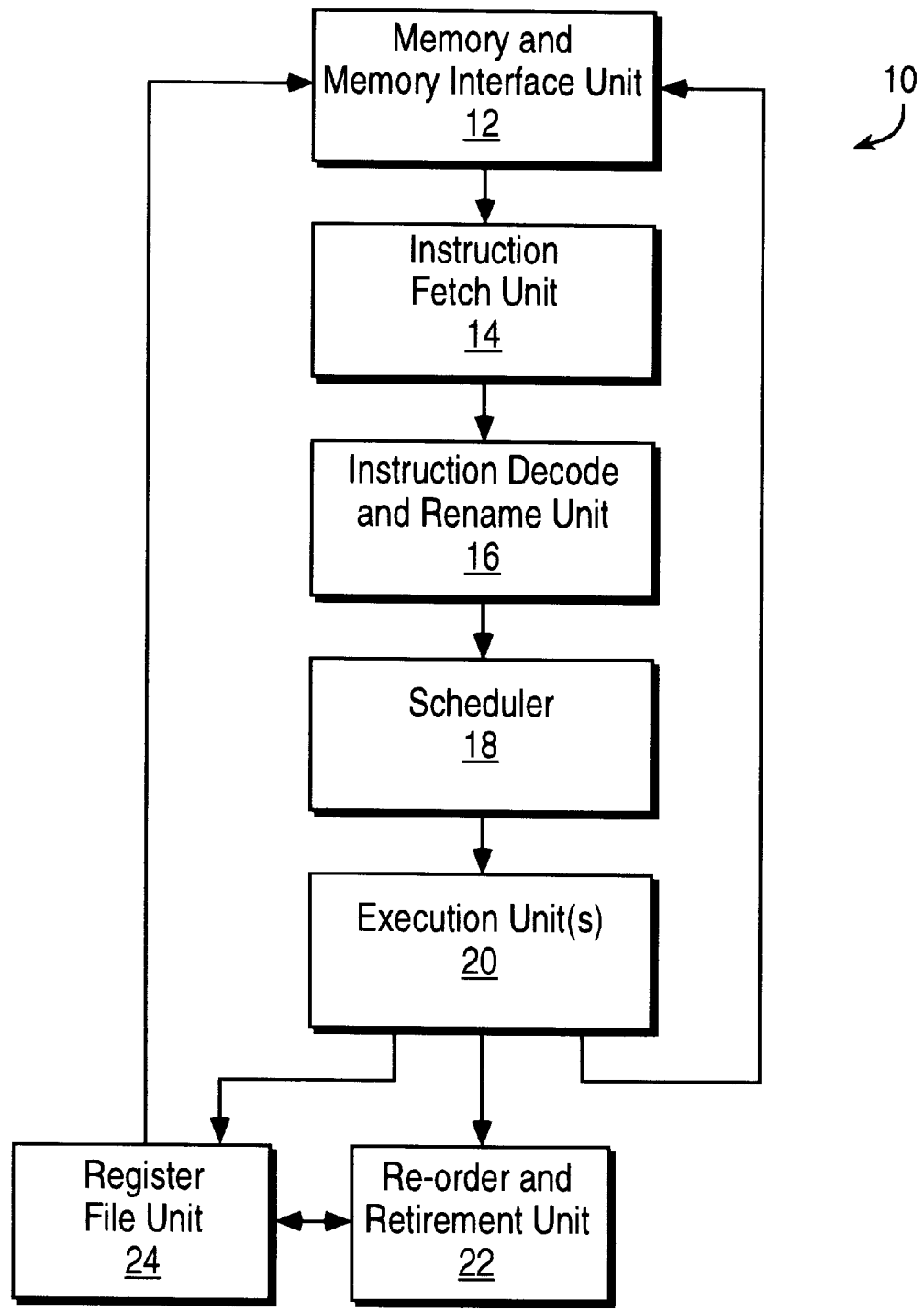
FIG. 1 illustrates in block diagram form portions of the general architecture of a traditional processor that implements out-of-order execution of instructions.
Figure 2A:
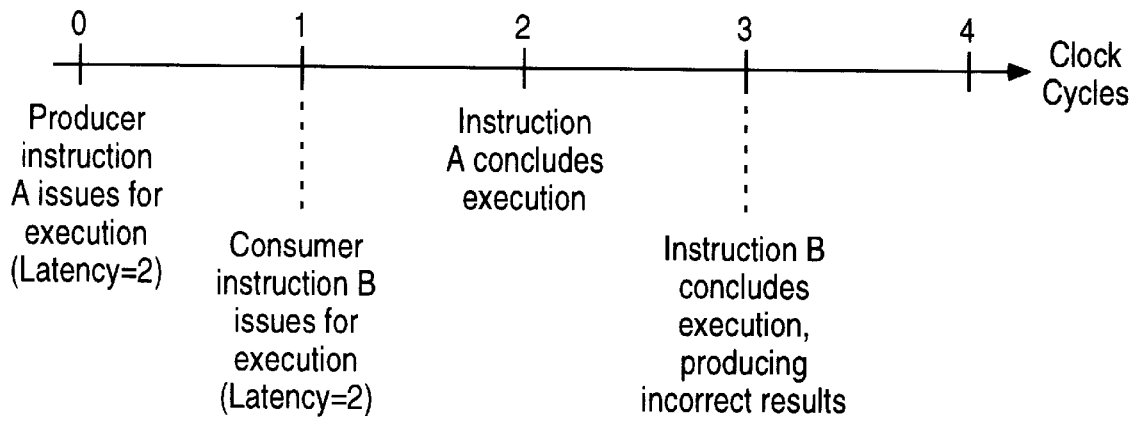
FIG. 2A shows a prior art example of a timing diagram for the execution of two typical dependent instructions separated by an insufficient number of clock cycles, leading to processor failure.
Figure 2B:
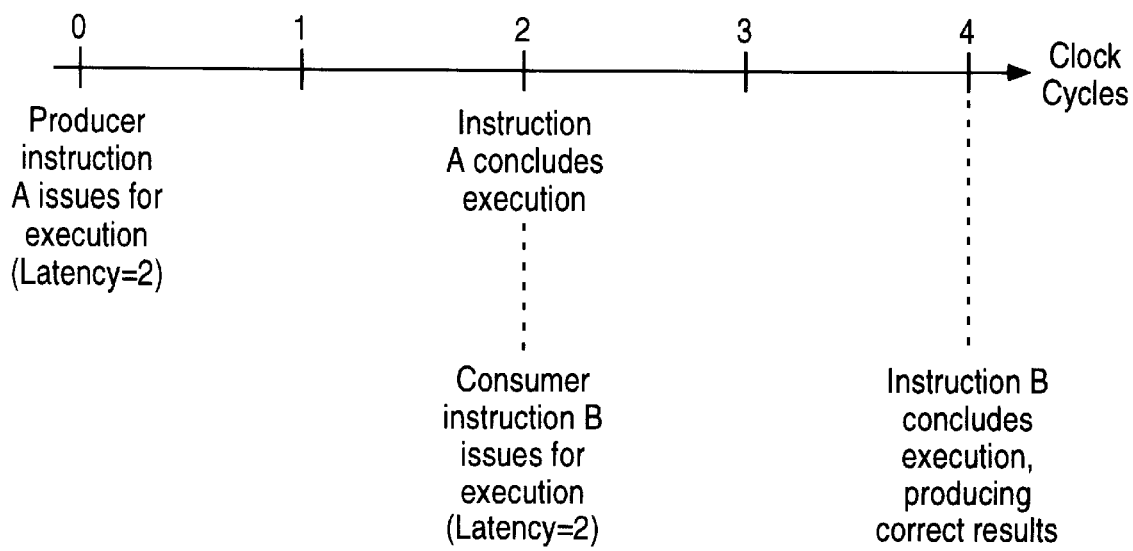
FIG. 2B shows a prior art example of a timing diagram for the execution of two typical dependent instructions separated by a sufficient number of clock cycles, leading to proper execution of the two instructions by the processor.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 3:
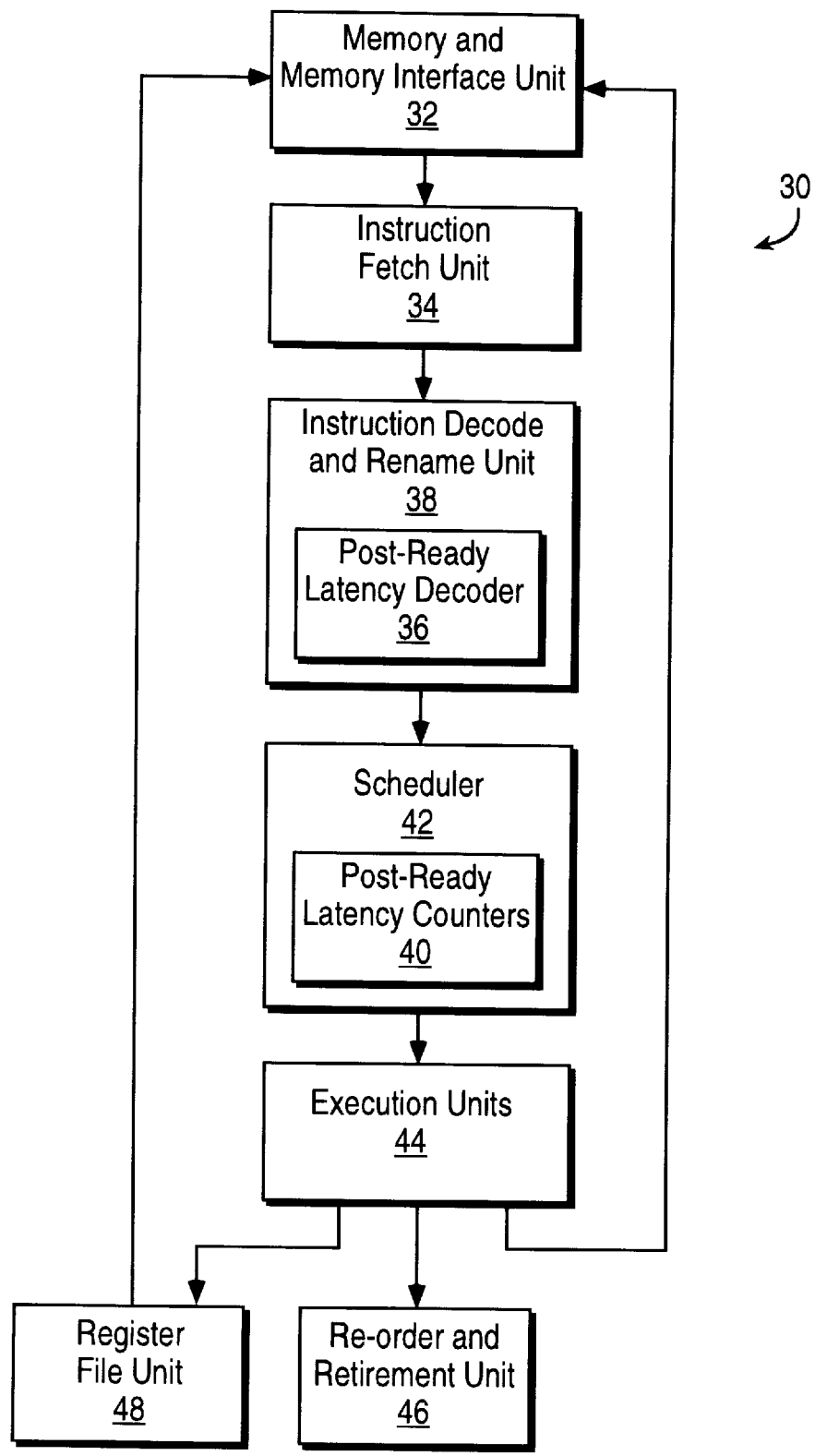
FIG. 3 illustrates in block diagram form portions of an out-of-order-execution processor that uses the concept of post-ready latency to ensure proper execution of instructions.

Turning to the drawings, FIG. 3 illustrates in block diagram form portions of an out-of-order-execution processor 30 that guarantees minimum variable schedule distance between instructions. The out-of-order processor 30 comprises a memory and memory interface unit 32; an instruction fetch unit 34; an instruction decode and rename unit 38; a scheduler 42; at least one execution unit 44; a reorder and retirement unit 46; and a register file unit 48.

The memory and memory interface unit 32 stores the program code and data and provides a means for the processor to access the memory. The memory and memory interface unit 32 may also include one or more data and code cache memories (not shown) to speed up the memory-access operations of the processor 30.

The instruction fetch unit 34 comprises a fetcher (not shown) that retrieves a sequence of instructions from the memory and memory interface unit 32. The instruction fetch unit 34 sends the retrieved instruction sequence to one or more of the instruction decode and rename units 38. With the aid of microcode read-only memories (not shown), instruction decoders in the instruction decode and rename unit 38 translate the complex instructions into simpler, hardware-executable micro-ops.

The decoders send a sequence of micro-ops to a renamer that resides in the instruction decode and rename unit 38. To avoid data dependencies and the resulting loss in processor performance, the processor 30 renames logical destinations to physical destinations as part of reordering the micro-ops for out-of-order execution. The renaming process avoids artificial dependencies created by hazards. The renamer reassigns additional physical registers to replace the destination registers designated in the micro-ops. The renamer may also record in a dependency table (not shown) data on the dependencies between the micro-ops of the instruction sequence and on the reassignment of additional physical registers. The renamer may communicate the micro-ops and their renamed registers to both a reorder buffer (not shown) and to the scheduler 42.

The instruction decode and rename unit also comprises a post-ready latency decoder 36. The post-ready latency decoder 36 operates as follows: For each instruction in the instruction sequence received from the instruction fetch unit 34, as part of the general decoding of the instruction, the post-ready decoder 36 determines the post-ready latency of the instruction. To determine the post-ready latency of an instruction, the post-ready latency decoder 36 uses pre-stored information readily available to it, for example, by using information stored in one or more read-only memories (not shown). The instruction decode and rename unit communicates the post-ready latency value for each instruction to the scheduler 42.

The post-ready latency decoder 36 determines the post-ready latency of each instruction based on several factors. First, the post-ready latency decoder 36 examines the type of instruction, i.e., whether the instruction constitutes a producer instruction or a consumer instruction. The type of instruction determines in part the instruction's post-ready latency. Assigning post-ready latency to consumer instructions ensures that they execute after their respective producer instructions have finished execution, separated by a number of clock cycles equal to their post-ready latency values.

The post-ready latency decoder 36 also examines the operation performed by the instructions (e.g., load, store). The need to examine the operation of instructions may arise from a variety of factors, such as inherent limitations in the design of the processor 30 (for example, the lack of a direct bypass between two execution units). In addition, the post-ready latency decoder 36 may also take into account the need for additional clock cycles allotted for special operations, such as processing faults, between the execution of that instruction and a following consumer instruction.

The above factors serve only to highlight a non-exclusive list of the considerations that help the post-ready decoder 36 determine the post-ready latency value for each instruction. The breadth of the concept of using post-ready latency to ensure variable minimum execution distance between instructions, however, makes the concept attractive in combating other similar problems. With the benefit of this disclosure, those skilled in the art will therefore appreciate that the need for additional clock cycles between the execution of two instructions may depend on other factors in addition to those discussed here.

The scheduler 42 has the responsibility of scheduling instructions for execution within one or more of the execution units 44. The instructions received from the instruction decode and rename unit 38, along with their post-ready latencies, form a pool of instructions that the scheduler 42 may assign for execution to execution units 44. To achieve higher efficiency and throughput, the scheduler 42 may assign instructions for execution in a different order than the original order of the instruction sequence fetched by the instruction fetch unit 34 from the memory and memory interface unit 32.

The scheduler 42 may also consult a dependency table (not shown) residing in the instruction decode and rename unit 38 to determine the instruction dependency and assignment information on logical and additional physical registers. Based on the results of the consultation, the scheduler 42 may update the dependency and assignment information residing in the dependency table (not shown).

Similar to the tables that schedulers in traditional out-of order processors use (see FIG. 4A), the scheduler 42 according to the present invention also uses a table for storing and keeping track of various items of information pertaining to the pool of instructions. FIG. 4B illustrates an example of such a table for a pool of N instructions. As a comparison of FIGS. 4A and 4B reveals, in addition to the information present in table entries of prior art schedulers, the entries in the table for a scheduler according to the present invention also have a post-ready latency field.

The post-ready latency field in each of the scheduler table entries has a width (in bits) corresponding to the desired maximum post-ready latency. In other words, the desired maximum number of clock cycles between two instructions determines the width of the post-ready latency field in the scheduler table entries. For example, a 3-bit post-ready latency field allows a maximum post-ready latency of $2^3$, or 8, clock cycles. The table entries in one embodiment of the present invention have a width of 2 bits, corresponding to a maximum post-ready latency of 4 clock cycles.

Turning back to FIG. 3, each post-ready latency field in the scheduler table corresponds to the post-ready latency of the instruction that the particular table entry represents. The post-ready fields in the table entries of the scheduler 42 comprise a plurality of post-ready latency counters 40. The post-ready latency counters 40 may take the form of digital counters. Thus, the number of the bits in the post-ready fields corresponds directly to the number of bits in the counter. A person skilled in the art will appreciate that one can realize the post-ready latency counters 40 in a number of ways. In one embodiment of the present invention, the post-ready latency counters 40 comprise 2-bit-wide shift registers, corresponding to a maximum post-ready latency of 4 clock cycles.

The scheduler 42 stores the post-ready latency of each instruction in the digital counter corresponding to that instruction's post-ready field. The counter then counts clock cycles down to zero. The scheduler 42 ensures that an instruction does not become available to any of the execution units 44 until the countdown corresponding to that instruction's post-ready latency has expired. Of course, instructions that have a post-ready latency of zero become available for execution by the execution units 44 without any post-ready latency (i.e., as soon as the operands of the instruction, if any, and an appropriate execution unit become available).

A reorder and retirement unit 46 receives executed instructions from the execution units 44 and reorders the instructions in the same order as the instruction order of the original program code. The reorder and retirement unit 46 and the execution units 44 send the results of the execution of the instructions to the register file unit 48. The register file unit 48 sends the results of the executed instructions to the memory and memory interface unit 32 for storage in the main memory, as necessary.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for scheduling instructions for execution, comprising:

receiving a plurality of instructions;

determining a post-ready latency of each instruction;

scheduling each instruction for execution with each instruction following an earlier instruction by an amount of time at least equal to the post-ready latency of the instruction.

2. The method according to claim 1, where determining the post-ready latency of each instruction further comprises providing the instruction to an instruction decode and rename unit.

3. The method according to claim 2, where determining the post-ready latency of each instruction by the instruction decode and rename unit further comprises using a post-ready latency decoder.

4. The method according to claim 1, where scheduling each instruction for execution further comprises using a post-ready latency counter for the instruction.

5. A method for scheduling instructions for execution, comprising:

fetching a plurality of instructions from a memory;

using an instruction decode and rename unit to determine the post-ready latency of each instruction;

providing each instruction and its corresponding post-ready latency to a scheduler; and using the scheduler to schedule each instruction for execution by an execution unit with execution of the instruction following the execution of an earlier instruction by an amount of time at least equal to the post-ready latency of the instruction.

6. The method according to claim 5, where using the instruction decode and rename unit to determine the post-ready latency of each instruction further comprises using a post-ready latency decoder.

7. The method according to claim 5, where scheduling each instruction for execution by an execution unit further comprises using a post-ready latency counter for each instruction.

8. A method for executing instructions, comprising:

receiving a plurality of instructions from a memory;

determining the post-ready latency of each instruction;

delaying execution of each instruction after execution of an earlier instruction by an amount of time at least equal to the post-ready latency of the instruction; and executing each instruction by an execution unit.

9. The method according to claim 8, where receiving the instructions from the memory further comprises using an instruction fetch unit.

10. The method according to claim 8, where determining the post-ready latency of each instruction further comprises using an instruction decode and rename unit.

11. The method according to claim 8, where delaying the execution of each instruction further comprises using a post-ready latency counter for each instruction.

12. An apparatus for scheduling instructions for execution, comprising a scheduler adapted to receive a plurality of instructions and to schedule each instruction for execution, execution of the instruction following the execution of an earlier instruction by an amount of time at least equal to the post-ready latency of the instruction.

13. An apparatus according to claim 12, where the scheduler contains a plurality of scheduler entries, each entry corresponding to one of the instructions.

14. An apparatus according to claim 13, where each scheduler entry contains a post-ready field.

15. An apparatus according to claim 14, where each post-ready field comprises a counter.

16. An apparatus according to claim 15, where each counter is two bits wide.

17. An apparatus according to claim 15, where each counter comprises a shift-register.

18. An apparatus for executing instructions, comprising:

means for fetching a plurality of instructions from a memory;

means for determining the post-ready latency of each instruction;

means for scheduling each instruction for execution so that the instruction follows an earlier instruction by an amount of time equal to at least the post-ready latency of the instruction; and means for executing each instruction.

19. An apparatus for executing instructions, comprising:

an instruction fetch unit;

an instruction decode and rename unit operably associated with the instruction fetch unit, the instruction decode and rename unit further comprising a post-ready latency decoder;

a scheduler operably associated with the instruction decode and rename unit; and at least one execution unit operably associated with the scheduler.

20. An apparatus according to claim 19, where the scheduler comprises a plurality of post-ready latency counters.

21. An apparatus according to claim 20, where each post-ready latency counter comprises a shift-register.

22. An apparatus according to claim 20, where each post-ready latency counter is 2 bits wide.

* * * * *

UNITED STATES PATENT AND TRADEMARK OFFICE
CERTIFICATE OF CORRECTION

PATENT NO. : 5,996,064
DATED : November 30, 1999
INVENTOR(S) : Zaidi et al.

It is certified that error appears in the above-identified patent and that said Letters Patent is hereby corrected as shown below:

Column 1,
Line 42, delete "modem", insert -- modern --.

Signed and Sealed this

Twenty-second Day of July, 2003

JAMES E. ROGAN
*Director of the United States Patent and Trademark Office*